US010680796B2

(12) United States Patent
Schepers et al.

(10) Patent No.: US 10,680,796 B2
(45) Date of Patent: Jun. 9, 2020

(54) COMPUTING WITH ENCRYPTED VALUES

(71) Applicant: KONINKLIJKE PHILIPS N.V., Eindhoven (NL)

(72) Inventors: Hendrik Jan Jozef Hubertus Schepers, Veldhoven (NL); Paulus Mathias Hubertus Mechtildis Antonius Gorissen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 241 days.

(21) Appl. No.: 15/572,857

(22) PCT Filed: May 5, 2016

(86) PCT No.: PCT/EP2016/060121
§ 371 (c)(1),
(2) Date: Nov. 9, 2017

(87) PCT Pub. No.: WO2016/184695
PCT Pub. Date: Nov. 24, 2016

(65) Prior Publication Data
US 2018/0139038 A1 May 17, 2018

(30) Foreign Application Priority Data
May 19, 2015 (EP) .................. 15168069

(51) Int. Cl.
*H04L 9/06* (2006.01)
*H04L 9/00* (2006.01)
*G09C 1/00* (2006.01)

(52) U.S. Cl.
CPC ............ *H04L 9/002* (2013.01); *G09C 1/00* (2013.01); *H04L 9/0618* (2013.01); *H04L 9/0631* (2013.01); *H04L 2209/16* (2013.01)

(58) Field of Classification Search
CPC ....... H04L 9/002; H04L 9/068; H04L 9/0631; H04L 2209/046; H04L 2209/16; G06F 21/14; G06F 2221/2123; G06F 2221/2135
See application file for complete search history.

(56) References Cited

U.S. PATENT DOCUMENTS 4,278,837 A 7/1981 Best
4,905,277 A 2/1990 Nakamura
(Continued)

FOREIGN PATENT DOCUMENTS

WO 0077597 A1 12/2000
WO 2013104969 A1 7/2013
(Continued)

OTHER PUBLICATIONS

Green, Matthew "A Few Thoughts on Cryptographic Engineering" [Online], Feb. 2, 2012 [Retrieved: Sep. 15, 2019], blog. cryptographyengineering.com, Retrieved from: < https://blog.cryptographyengineering.com/2012/02/02/multiple-encryption/ > (Year: 2012).*

(Continued)

*Primary Examiner* — Eric W Shepperd

(57) ABSTRACT

A secure calculation is performed on at least one input value. The calculation includes a number of operations, with a first operation performed on the input value, and subsequent operations performed on results produced by previous operations. An initial encryption rank is set, based on the number of operations to be performed in the calculation. The input value is encoded, together with the initial encryption rank. The calculation is then performed, such that the first operation is performed on the encoded input value to produce an encoded result, and subsequent operations are performed on respective encoded results produced by previous operations to produce further encoded results. A new encryption rank is set when an operation in the calculation (Continued)

is performed on the encoded input value or on an encoded result produced by a previous operation, such that the encoded result of said operation in the calculation has the new encryption rank. A decoding function provides a useable output value from an encoded result only if the encoded result has an encryption rank that has reached a predefined value.

17 Claims, 4 Drawing Sheets

(56) References Cited

U.S. PATENT DOCUMENTS

| | | | | |
|---|---|---|---|---|
| 8,600,048 | B1* | 12/2013 | Hansen | G06F 21/62 380/28 |
| 2004/0139340 | A1* | 7/2004 | Johnson | G06F 21/14 713/194 |
| 2005/0036618 | A1 | 2/2005 | Gammel et al. | |
| 2006/0056622 | A1* | 3/2006 | Liardet | H04L 9/003 380/28 |
| 2008/0021941 | A1 | 1/2008 | Huque et al. | |
| 2008/0152129 | A1 | 6/2008 | Wu | |
| 2010/0278339 | A1 | 11/2010 | Frenkel et al. | |
| 2012/0093313 | A1* | 4/2012 | Michiels | H04L 9/002 380/255 |
| 2012/0155638 | A1* | 6/2012 | Farrugia | H04L 9/0631 380/45 |
| 2012/0204039 | A1 | 8/2012 | Farrugia et al. | |
| 2012/0300922 | A1 | 11/2012 | Billet et al. | |
| 2013/0061061 | A1* | 3/2013 | Farrugia | G09C 1/00 713/190 |
| 2014/0059346 | A1* | 2/2014 | Campagna | H04W 12/02 713/168 |
| 2015/0293911 | A1* | 10/2015 | Tolhuizen | G09C 1/00 707/827 |

FOREIGN PATENT DOCUMENTS

| | | |
|---|---|---|
| WO | 2014095772 A1 | 6/2014 |
| WO | 2014096117 A1 | 6/2014 |

OTHER PUBLICATIONS

Chow et al: "White-Box Cryptography and an AED Implementation"; SAC 2002, LNCS 2595, pp. 250-270, 2003.

Cover et al: "Elements of Information Theory"; Copyright 1991, John Wiley & Sons, Inc., Oct. 2001, Editor: Donald I. Schilling.

* cited by examiner

COMPUTING WITH ENCRYPTED VALUES

CROSS-REFERENCE TO PRIOR APPLICATIONS

This application is the U.S. National Phase application under 35 U.S.C. § 371 of International Application No. PCT/EP2016/060121, filed on May 5, 2016, which claims the benefit of European Patent Application No. 15168069.1, filed on May 19, 2015. These applications are hereby incorporated by reference herein.

FIELD OF THE INVENTION

This invention relates to the field of computing, and in particular to computing with encrypted values.

BACKGROUND OF THE INVENTION

WO2014/096117 discloses a computing device for computing with encrypted values.

More specifically, WO2014/096117 discloses a computing device storing a table network. The device is configured to obtain the function-input value as an encoded input value, where the encoded input value combines the function-input value with a state-input value encrypted together into a single value. The table network is configured to take the encoded input value as its input, and to produce an encoded output value as its output. The encoded output value combines a function-output value with a state-output value encrypted together into a single value, where the function-output value equals the result of applying a data function to the function-input value, and the state-output value equals the result of applying a state function to the state-input value.

US 2012/155638 A1 discloses a solution to hide cryptographic keys in cryptographic processes that involve key injection using an exclusive OR. US 2012/155638 A1 hides the cipher key by performing a linear permutation P on both keys and on the cipher-text. As one can directly compute a XOR on values that were passed through permutation P without returning to the "regular" world, operations can be performed in a hidden way from an attacker, who can only observe the permuted keys.

SUMMARY OF THE INVENTION

According to an aspect of the invention, there is provided a method of performing a secure calculation comprising: receiving at least one function input value and state input value; determining a number of operations to be performed in the calculation, wherein a first operation is performed on the input value, and subsequent operations are performed on results produced by previous operations; setting an initial encryption rank for the input value based on the number of operations to be performed in the calculation; encoding the at least one function input value and/or state input value together with the initial encryption rank, wherein the encryption rank occupies some of the bits of the function input value and/or state input value in the encoding; performing the calculation, such that the first operation is performed on the encoded input value to produce an encoded result, and subsequent operations are performed on respective encoded results produced by previous operations to produce further encoded results; setting a new encryption rank when an operation in the calculation is performed on the encoded input value or on an encoded result produced by a previous operation, such that the encoded result of said operation in the calculation has the new encryption rank; and performing a decoding function, wherein the decoding function provides a useable output value from an encoded result only if the encoded result has an encryption rank that has reached a predefined value.

This has the advantage that, in certain embodiments, an unauthorized party is unable to obtain information about the encoding process by obtaining intermediate results of operations in the calculation.

According to a second aspect of the invention, there is provided a computing device for performing the method of the first aspect.

These and other aspects of the invention will be apparent from and elucidated with reference to the embodiments described hereinafter.

BRIEF DESCRIPTION OF THE DRAWINGS

These and other aspects of the invention are apparent from and will be elucidated with reference to the embodiments described hereinafter with reference to the following drawings.

DETAILED DESCRIPTION OF EMBODIMENTS

Figure 1:
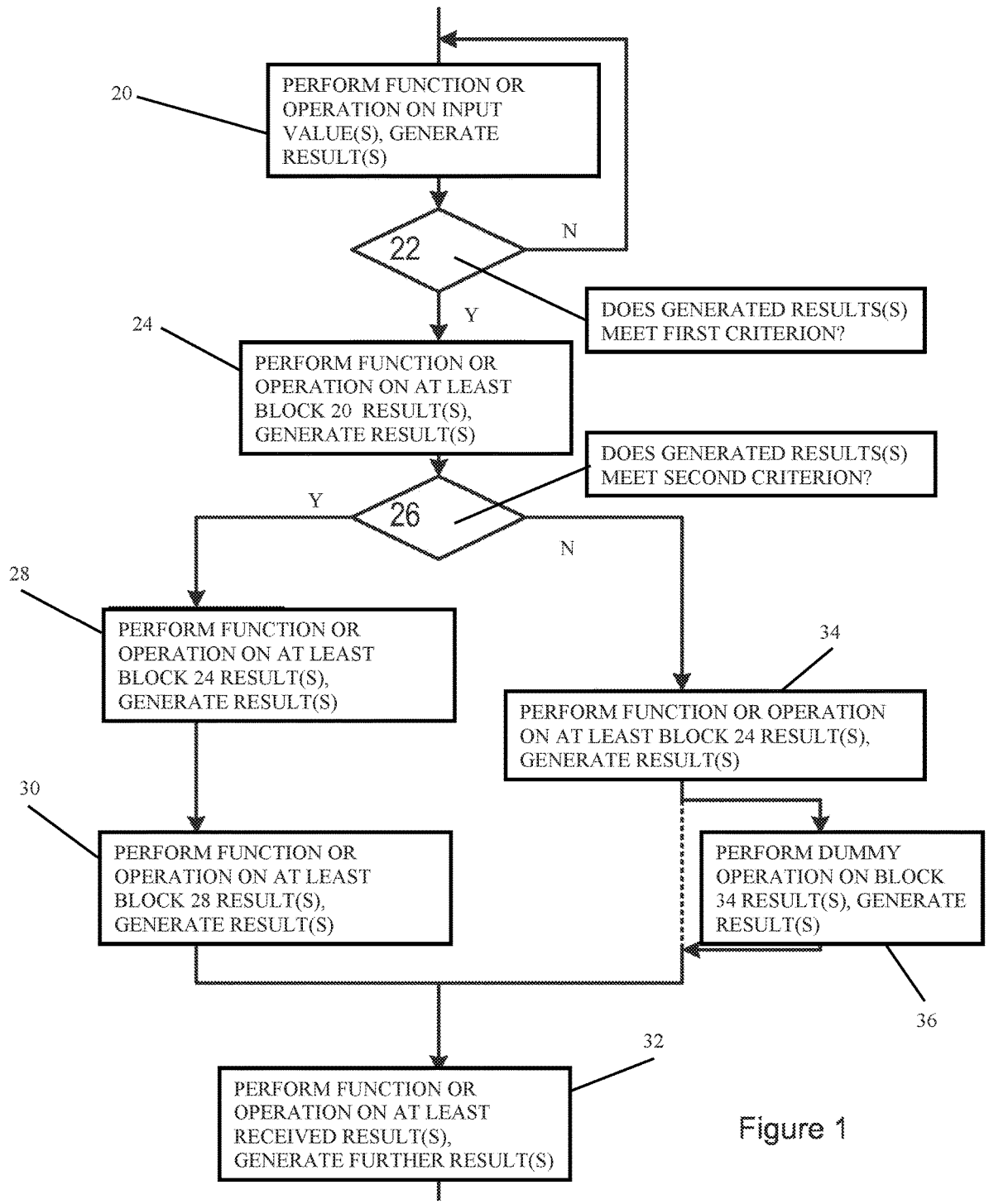
FIG. 1 is a flowchart illustrating a method for performing a calculation.

FIG. 1 is a flow chart, illustrating a method of performing a secure calculation. At least one input value is supplied to a first operational block 20, which performs a function or operation on the input value or values to generate at least one result value.

The at least one result value from the first operational block 20 is supplied to a decision block 22, which determines whether the at least one result value from the first operational block 20 meets a first specified criterion. If the first specified criterion is met, the at least one result value from the first operational block 20, possibly together with at least one additional input value, is supplied to a second operational block 24, which performs a function or operation on the input value or values to generate at least one result value.

If the first specified criterion is not met, the at least one result value from the first operational block 20, is returned to the input of the first operational block 20, for the respective function or operation to be performed again. This may be repeated any number of times.

The at least one result value from the second operational block 24 is supplied to a second decision block 26, which determines whether the at least one result value from the second operational block 24 meets a second specified criterion. If the second specified criterion is met, the at least one result value from the second operational block 24, possibly together with at least one additional input value, is supplied to a third operational block 28.

The third operational block 28 performs a function or operation on the input value or values to generate at least one result value. The at least one result value from the third operational block 28, possibly together with at least one additional input value, is supplied to a fourth operational block 30.

The fourth operational block 30 performs a function or operation on the input value or values to generate at least one result value.

The at least one result value from the fourth operational block 30, possibly together with at least one additional input value, is supplied to a fifth operational block 32.

The fifth operational block 32 performs a function or operation on the input value or values to generate at least one result value.

If the second decision block 26 determines that the second specified criterion is not met, the at least one result value from the second operational block 24, possibly together with at least one additional input value, is supplied to a sixth operational block 34.

The sixth operational block 34 performs a function or operation on the input value or values to generate at least one result value. The at least one result value from the sixth operational block 34, possibly together with at least one additional input value, is supplied to the fifth operational block 32.

As before, the fifth operational block 32 performs a function or operation on the input value or values to generate at least one result value.

In this case, as the fifth operational block 32 is the final operational block in the method, the result value generated by the fifth operational block 32 acts as the output value of the method.

In one embodiment, the input value supplied to the first operational block 20 and the output value supplied from the final operational block 32 are in a plain, or human-interpretable form. In other embodiments, the input value supplied to the first operational block 20 may itself be in an encrypted form. For example, the input value may be signed using a particular authentication protocol, or may be encrypted using the Data Encryption Standard (DES) or the Advanced Encryption Standard (AES) based on a particular DES key or AES key, as required. The input value may be received in a particular encryption domain (and unencrypted data is also regarded as being in one specific encryption domain), and the output value may be generated in the same encryption domain or in a different domain. Thus, the output value can be used by a subsequent process.

More generally, the input value and the output value can each be said to be in a public domain, containing information that can be interpreted by effectively any party.

Figure 2:
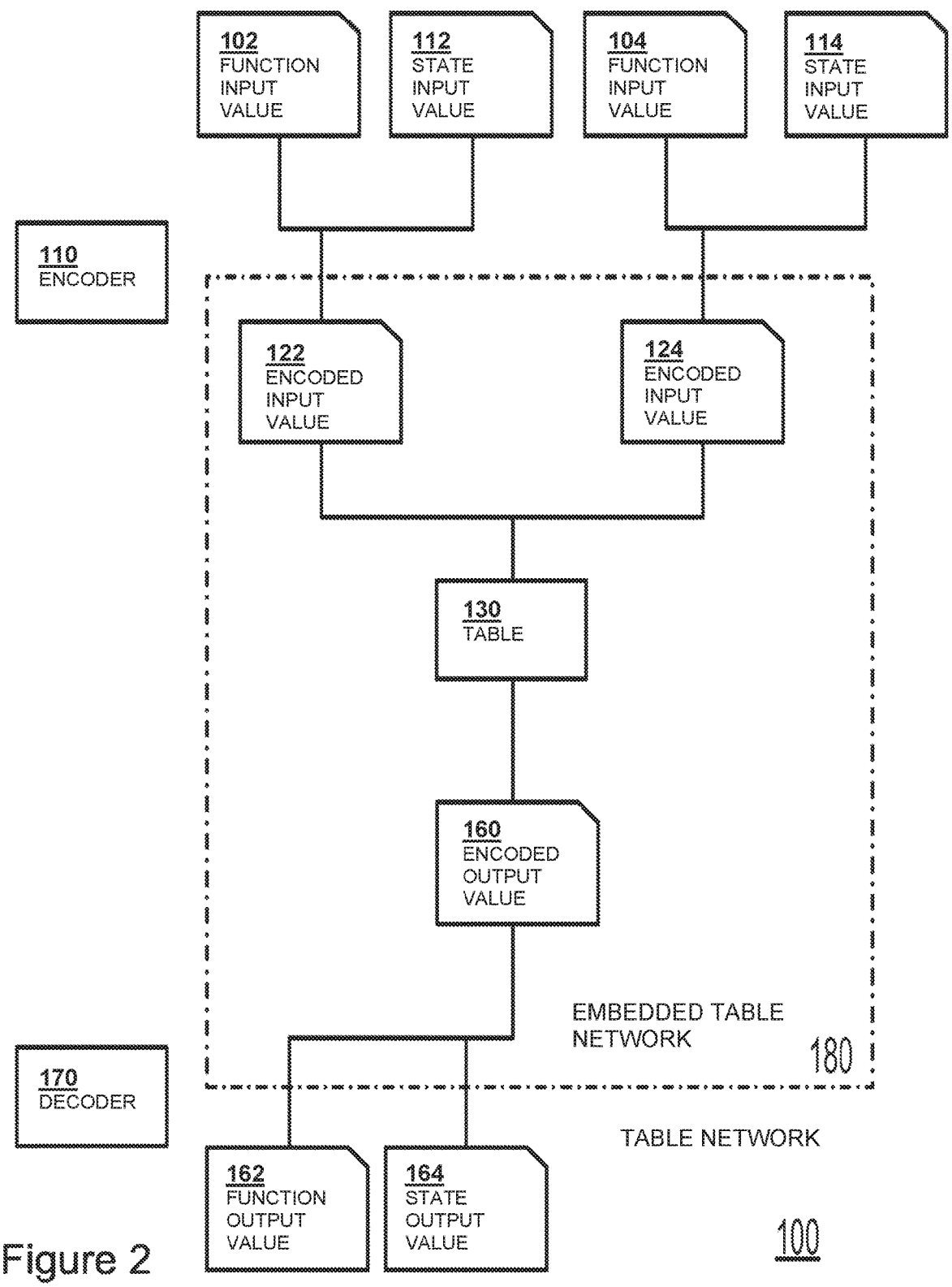
FIG. 2 is schematic chart illustrating a table network implementing a data function and a state function.

FIG. 2 shows in more detail the form of each of the operational blocks 20, 24, 28, 30, 32, 34, in one embodiment.

Specifically, FIG. 2 illustrates the case where the operational blocks operate using table networks.

FIG. 2 shows a table network 180 embedded in a larger table network 100. Thus, the table network 180 may be used for the operational blocks 20, 24, 28, 30, 32, 34 shown in FIG. 1. Table network 180 as shown contains only a single table 130. As noted, it is possible to implement table 130 as a table network, in a trade-off, e.g., between table size, and security. In FIG. 2, tables are illustrated with rectangles, and values are illustrated with a rectangle with the upper right corner cut-off.

Table network 180 is configured to take multiple encoded input values as input, for example encoded input values 122 and 124. Table network 180 is configured to produce as output an encoded output value 160. In the description below we will assume data functions and state functions having two input values and a single output value. However, the embodiments may be extended to any number of input values and/or output values. In particular data/state functions with one input and one output are possible and data/state functions with two inputs and one output are possible.

Table network 180 is configured for the data function and is stored in an electronic storage, coupled to an electronic processor configured to compute the data function by applying the table network.

The encoded value 122 is obtained from a function input value 102 and a state input value 112 and the encoded value 124 is obtained from a function input value 104 and a state input value 114. For example, this may be done by an encoder 110. Encoder 110 may be included in the same device which stores table network 180, but this is not needed. Input values may be received already in encoded form and/or be transmitted in encoded form. Or they may be received/transmitted in un-encoded form. In the latter case they may be encoded and used internally in encoded form. There may also be a re-encoding, e.g., if outside of the device a different encoding is used. For example, function output value 162 and state output value 164 may be obtained from a decoder 170. Encoded input of the data function may be the output of another table or table network. The latter may or may not be a table network configured for two functions. By combining table networks configured for different data functions, entire programs may be built up.

The encoder 110 and the decoder 170 may be obtained as each other's inverse.

The encoder 110 may be obtained as follows. Each possible combination of function input value and state input value is listed. For example, if both are 4 bit wide, then there are 16*16=256 possible combinations. The 256 combinations may be mapped to itself in a random bijective order. The same applies to other sizes. Also an encryption function may be used, e.g., an 8 bit block cipher may be applied, using some secret encoding key.

The encoded input value contains the function input value 102 (referred to w as below) and state input value 112 (referred to σ as below) in an interdependent way, e.g., the function input depends on all bits of the encoded input. Thus, knowing only part of encoded input value 122 will generally not allow one to find either function input value 102 or state input value 112.

Thus, the input value is encoded, and an operation is performed on the input value to obtain an encoded output value.

As described in more detail below, each encoded value is within an encrypted data domain, which can only be interpreted by a party that has the key to this domain.

In a method of the general type shown in FIG. 1, in which the process includes multiple operations, the result of one operation may be passed to the input of a subsequent operation without decoding.

However, an attacker, wishing to obtain information about the method, might be able to intercept the method, and obtain the encoded result of one operation. The attacker may then be able to apply the decoding step to that encoded result, in order to obtain information about the method.

In one embodiment, therefore, the method includes an initial step, for example to be performed on compiling a program to perform the method, of determining a number of operations within the method. In one embodiment, this is achieved by the compiler using a static single assignment form, in which each variable is assigned exactly once. Therefore, any variable that is used is typically extended with an index, so that every newly redefined variable is able to use a unique index. This process can be used in this case to determine how many operations will be performed on the input value, as this will be equal to the number of different indices that are allocated to the variable.

Then, an initial encryption rank is set for the initial input value or values, for example the initial input value or values supplied to the first operational block 20. This initial encryption rank is set based on the number of operations that the values will undergo as part of the method. This initial encryption rank is then associated with the encoded input value.

The encryption rank may be separate from the function value ω and the state value σ, or may occupy some of the bits of the ω and/or σ space.

Then, when each operation is performed, the encryption rank is altered.

Each encryption rank can be considered as a separate encoding scheme. The encoding schemes that are in use at the intermediate stages of the calculation are such that they cannot be decoded to produce a useable result.

For example, in one embodiment, the initial encryption rank is set to be a number that is equal to the number of operations that the values will undergo as part of the method. That is, if it is determined that the method will involve n operations, the initial encryption rank will be set to n, and so that the encoding $E_n$ is performed on the initial input value(s). Then, the encryption rank associated with the encoded value is decremented by one, each time that an operation is performed on the encoded input value in the calculation. Thus, after one operation has been carried out, the new encryption rank will be (n−1), and so the encoding $E_{n-1}$ is performed on the intermediate value(s).

The decoding operation, D, required to obtain a decoded output from the encoded values at each stage of the method, may be the inverse of the encoding operation, and in this embodiment is defined such that the decryption only results in a useable output value in the case where the encryption rank has been decremented to zero.

That is, the decrypt function operates such that:

$$D_i(E_j(\omega, \sigma)) = \begin{cases} \omega & \text{if } i = j \wedge i = 0 \\ \perp & \text{otherwise} \end{cases}$$

The statement that $D_i(E_j(\omega,\sigma))=\perp$ means that the function $D_i$ returns for this particular input an arbitrary, meaningless value that for most inputs is not ω, but for some values of ω it may return ω. That is, for some values of i not equal to zero, or i≠j there may be some values of ω, for which $D_i(E_j(\omega,\sigma))=\omega$. However, because these values will not be known, it will not be possible for a party intercepting the result to use these values to infer information about the encoding. The statement $D_i(E_j(\omega,\sigma))=\perp$ signifies that there is no correlation between $E_j(\omega,\sigma)$ and ω.

It will be appreciated that this method of setting the initial encryption rank, decrementing the encryption rank when an operation is performed, and performing a decoding operation that produces a useable output value when the rank is zero, is just one example. Many other schemes can be used, for example, in which the encoded input value can be decrypted to a useful output value, only if the encryption rank associated with the encoded input value indicates that the number of operations performed on the input value in the calculation has met some previously determined criterion.

For example, the encoded input value may be decrypted to a useful output value, only if the encryption rank associated with the encoded input value indicates that the number of operations performed on the input value in the calculation has reached the previously determined total number of operations. In this context, a useful output value may be a value that is in the same encryption domain as the input value. Thus, if the input value is in a human-interpretable form, the output value may also be in a human-interpretable form. If the input value is itself provided in an encrypted form outside the table network domain, the useful output value may be in the same encrypted form, and so it can be used by a subsequent process. However, it is also possible that the input value is provided in an encrypted form, but the output value is in a human-interpretable, or vice versa.

In the method shown in FIG. 1, and described above, it will be noted that the number of operations performed on the input value will vary, depending on whether the method follows the branch including the third operational block 28 and the fourth operational block 30, or whether it takes the branch including the sixth operational block 34.

Therefore, in a branched method, such as that shown in FIG. 1, one or more dummy operation, that does not alter the input value (such as adding zero to the input value, or multiplying the input value by one) is included in one of the branches, so that the number of operations performed on the input value will be the same in each branch.

Thus, FIG. 1 shows the inclusion of a dummy operation 36 which is included for this purpose. In this case, the at least one output value from the sixth operational block 34 is supplied to the dummy operation block 36, and the output of the dummy operation block 36, possibly together with at least one additional input value, is supplied to the fifth operational block 32.

Further, in the method shown in FIG. 1, there is a potential loop. That is, it is not known in advance how often the first operational block 20 will execute its operation.

In order to deal with this, the first operational block 20 may be configured such that, when the process loops back to the block 20 for a second or subsequent time, the encryption rank is reset to the value that it took when the process arrived at the block 20 for the first time.

Thus, the operational blocks 20, 24, 28, 30, 32, 34, and the dummy operation block 36, are configured such that, when the respective operation is completed, the encryption rank is decremented by one.

Then, the effect is that a useful output value can be obtained by applying the decryption mapping, only if the method is complete, and the final output value is obtained at the output of the fifth operational block 32.

This means that, even if an attacker gains access to the intermediate values, the attacker will not be able to decrypt these to obtain useful outputs, and so will not be able to obtain information about the intermediate steps of the method.

As an alternative for dealing with the situation shown in FIG. 1, where the calculation includes a potential loop, a method using modulo arithmetic may be used. Thus, for example, we consider a situation in which the calculation contains p operations, plus a further q operations within a loop that will be performed an unknown number of times. Then, the initial encryption rank is set to (p+q), and this rank is decremented each time that an operation is performed, and the decryption function is set so that it produces a useful output if the encryption rank is equal to (0 modulo q). That is, if the operations within the loop are performed once, the total number of operations performed is (p+q), and the encryption rank after completing the calculation is equal to 0, as in the simple case described above, and so the decryption function produces a useful output. However, if the operations within the loop are performed m times, the total number of operations performed is (p+m·q), and the encryption rank after completing the calculation is equal to −m·q. Because this is equal to (0 modulo q), the decryption function still produces a useful output.

Figure 3:
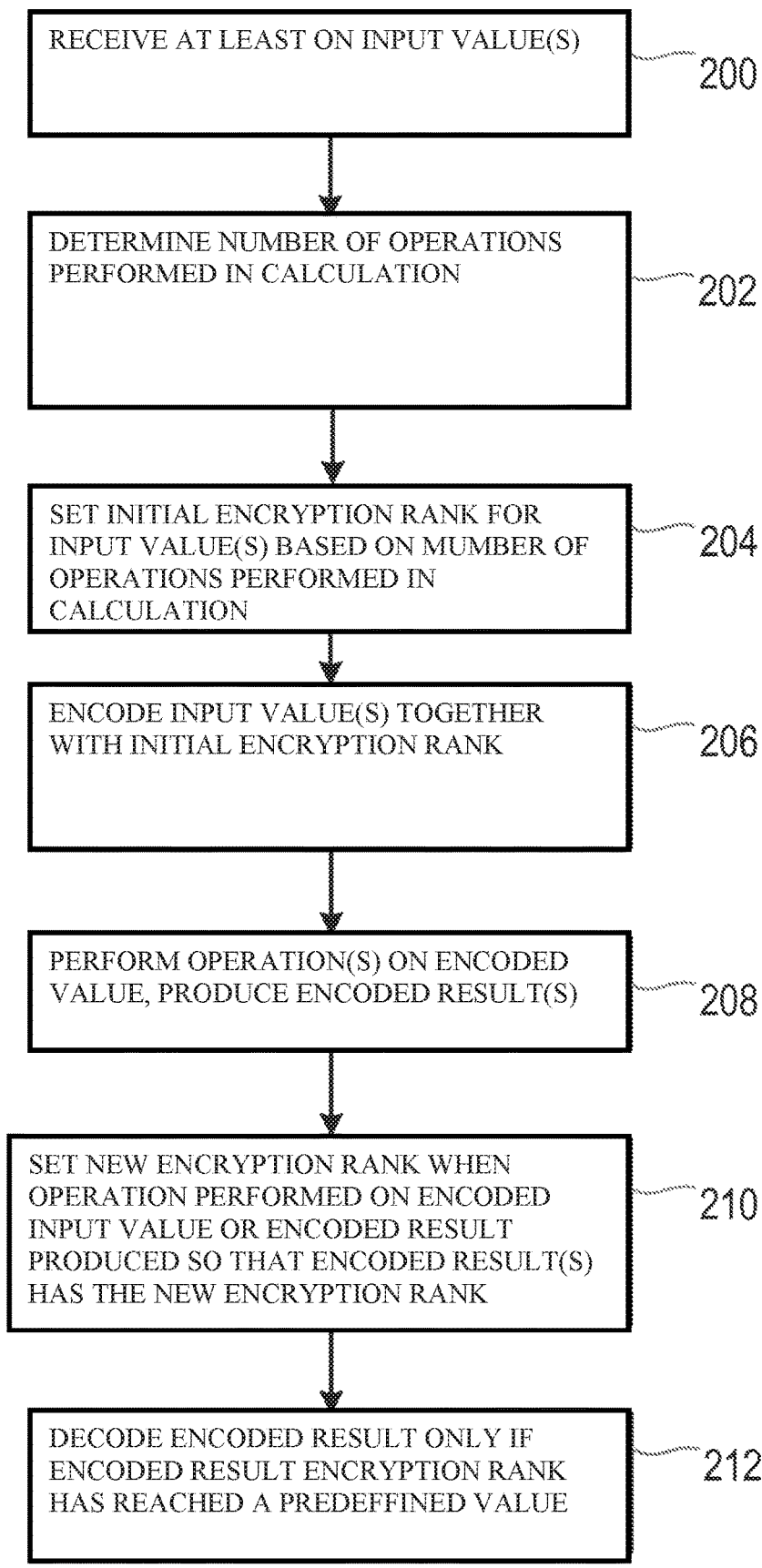
FIG. 3 is a flowchart illustrating a method for performing a calculation.

FIG. 3 is a flow chart, illustrating in outline the method of performing the secure calculation in a computing device. In step 200, the computing device receives at least one input value. In step 202, the computing device determines a number of operations to be performed in the calculation. A first operation is performed on the input value, and subsequent operations are performed on results produced by previous operations. In step 204, as described in more detail above, the computing device sets an initial encryption rank for the input value based on the number of operations to be performed in the calculation. In step 206, the computing device encodes the at least one input value together with the initial encryption rank. In step 208, the computing device performs the calculation, such that the first operation is performed on the encoded input value to produce an encoded result, and subsequent operations are performed on respective encoded results produced by previous operations to produce further encoded results. In step 210, the computing device sets a new encryption rank when an operation in the calculation is performed on the encoded input value or on an encoded result produced by a previous operation, such that the encoded result of said operation in the calculation has the new encryption rank. In step 212, the computing device performs a decoding function that provides a useable output value from an encoded result only if the encoded result has an encryption rank that has reached a predefined value.

It will be appreciated that FIG. 3 illustrates the steps performed in one embodiment of the invention, but that the order of steps is not necessarily as set out in FIG. 3. For example, the step of performing the decoding function can be performed as part of the initial set-up of the computing device and the encoding before any input value is received. Similarly, the step of determining the number of operations to be performed can be carried out before any input value is received.

Figure 4:
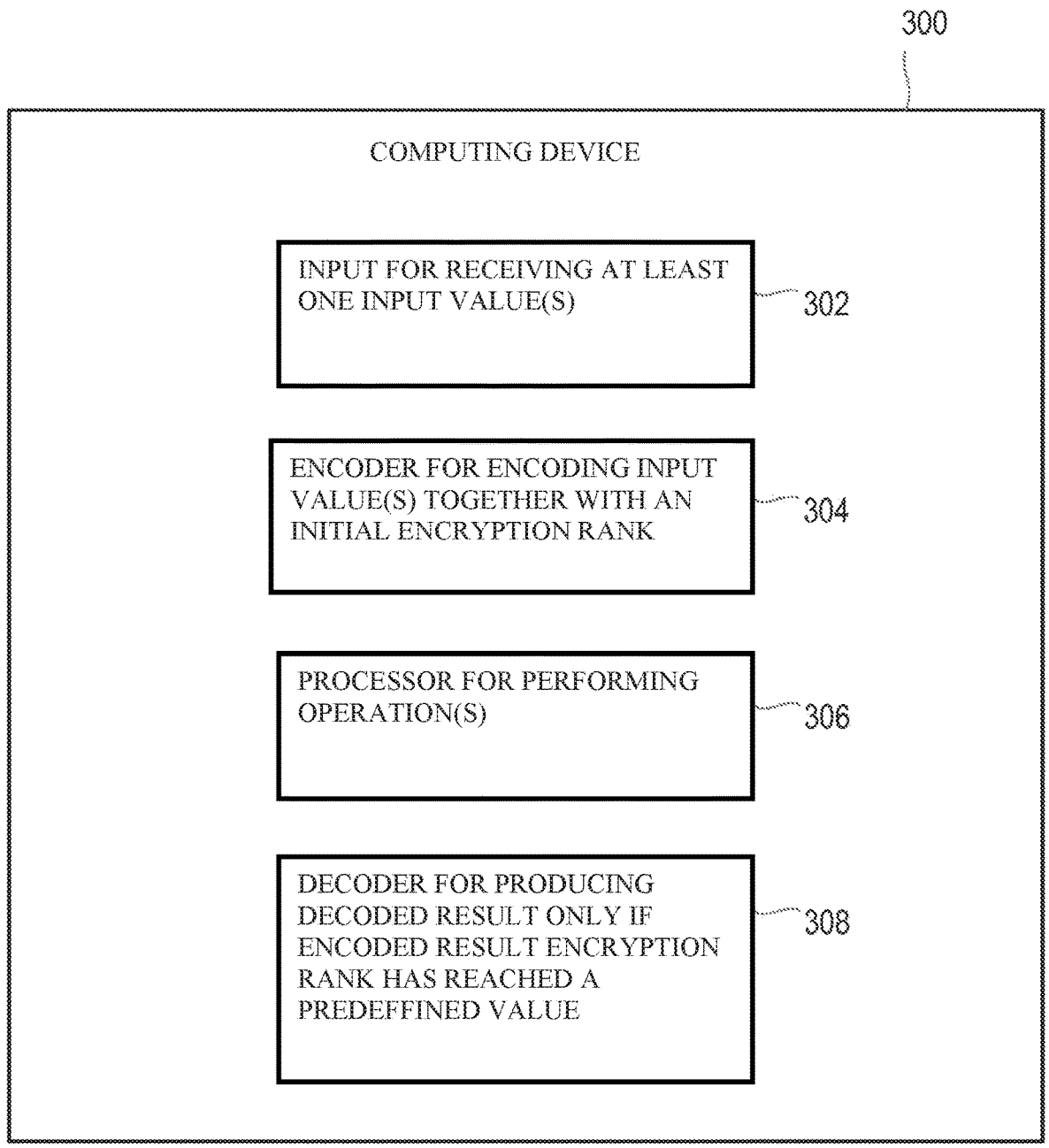
FIG. 4 illustrates a computing device for performing a calculation.

FIG. 4 illustrates a computing device 300 for performing the secure calculation. The computing device 300 includes an input 302 for receiving the at least one input value. An encoder 304 is provided for encoding the at least one input value together with an initial encryption rank, the initial encryption rank for the input value being set based on a number of operations to be performed in the calculation. A processor 306 performs a plurality of operations in the calculation, wherein a first operation is performed on the encoded input value to produce an encoded result, and subsequent operations are performed on respective encoded results produced by previous operations to produce further encoded results, and a new encryption rank is set when an operation in the calculation is performed on the encoded input value or on an encoded result produced by a previous operation, such that the encoded result of said operation in the calculation has the new encryption rank. A decoder 308 performs a decoding function that provides a useable output value from an encoded result only if the encoded result has an encryption rank that has reached a predefined value.

The method is described herein in an implementation in which the values are data values. However, the same method can be applied in applications in which the values are address values. In that case, the output value is a useful value, that maps to a correct address, only if the encryption rank has been decremented to zero.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of performing a secure calculation, the method comprising:
   receiving at least one function input value and a state input value;
   determining a number of operations to be performed in the calculation, wherein a first operation is performed on the at least one function input value, and subsequent operations are performed on results produced by previous operations;
   setting an initial encryption rank for the at least one function input value based on the number of operations to be performed in the calculation;
   encoding the at least one function input value and state input value together according to the initial encryption rank, wherein the initial encryption rank occupies some of the bits of the state input value in the encoding;
   performing the calculation, such that the first operation is performed on the encoded input value to produce an encoded result, and subsequent operations are performed on respective encoded results produced by previous operations to produce further encoded results;

setting a new encryption rank when a subsequent operation in the calculation is performed on the encoded input value or on a respective encoded result produced by a previous operation, such that the encoded result of said subsequent operation in the calculation has the new encryption rank; and performing a decoding function, wherein the decoding function provides a useable output value from a specific encoded result only when the specific encoded result has an encryption rank that has reached a predefined value.

2. The method as claimed in claim 1, wherein the at least one function input value comprises public domain data.

3. The method as claimed in claim 1, wherein the at least one function input value comprises data encrypted according to a predetermined encryption process.

4. The method as claimed in claim 1, wherein the useable output value comprises public domain data.

5. The method as claimed in claim 1, wherein the useable output value comprises data encrypted according to a predetermined encryption process.

6. The method as claimed in claim 1, wherein:
setting the initial encryption rank for the at least one function input value comprises setting the initial encryption rank equal to the number of operations to be performed in the calculation,
setting the new encryption rank when an operation in the calculation is performed on the encoded input value or on an encoded result is produced by a previous operation, comprises decrementing an encryption rank by one, and
performing the decoding function comprises providing the useable output value from the specific encoded result only when the encryption rank equals zero.

7. The method as claimed in claim 1, wherein the calculation comprises a loop, containing a first number of operations that may be performed an unknown number of times, and wherein:
setting the initial encryption rank for the at least one function input value comprises setting the initial encryption rank equal to the number of operations to be performed in the calculation, including one occurrence of each operation contained in said loop,
setting the new encryption rank comprises decrementing an encryption rank by one, and
performing the decoding function comprises providing the useable output value from the specific encoded result only when the encryption rank equals zero, modulo said first number.

8. The method as claimed in claim 1, wherein the calculation comprises a loop, containing a first number of operations that may be performed an unknown number of times, and wherein:
setting the initial encryption rank for the at least one function input value comprises setting the initial encryption rank equal to the number of operations to be performed in the calculation, excluding operations contained in said loop,
setting the new encryption rank comprises decrementing an encryption rank by one each time that an operation not contained in said loop is performed, and
performing the decoding function comprises providing the useable output value from the specific encoded result only when the encryption rank equals zero.

9. A computing device for performing a secure calculation, the computing device comprising:

an input for receiving at least one function input value and a state input value;

a processor configured to determine a number of operations to be performed in the calculation, set an initial encryption rank for the at least one function input value based on the number of operations to be performed in the calculation and to perform the number of operations in the calculation, wherein a first operation is performed on the at least one function input value, and subsequent operations are performed on results produced by previous operations;

an encoder coupled to the input and the processor, wherein the encoder is configured to encode the at least one function input value and state input value together with the initial encryption rank, wherein the processor is configured to perform the calculation, such that the first operation is performed on the encoded input value to produce an encoded result, and subsequent operations are performed on respective encoded results produced by previous operations to produce further encoded results, and the processor is configured to set a new encryption rank when a subsequent operation in the calculation is performed on the encoded input value or on a respective encoded result produced by a previous operation, such that the encoded result of said subsequent operation in the calculation has the new encryption rank; and a decoder coupled to the processor, wherein the decoder is configured to perform a decoding function, wherein the decoding function provides a useable output value from a specific encoded result only when the specific encoded result has an encryption rank that has reached a predefined value.

10. The computing device as claimed in claim 9, wherein the at least one function input value comprises public domain data.

11. The computing device as claimed in claim 9, wherein the at least one function input value comprises data encrypted according to a predetermined encryption process.

12. The computing device as claimed in claim 9, wherein the useable output value comprises public domain data.

13. The computing device as claimed in claim 9, wherein the useable output value comprises data encrypted according to a predetermined encryption process.

14. The computing device as claimed in claim 9, wherein:
the processor is configured to set the initial encryption rank for the at least one function input value equal to the number of operations to be performed in the calculation,
the processor is configured to set the new encryption rank by decrementing an encryption rank by one, and
the decoder is configured to provide the useable output value from the specific encoded result only when the encryption rank equals zero.

15. The computing device as claimed in claim 9, wherein:
the calculation comprises a loop, containing a first number of operations that may be performed an unknown number of times,
wherein the processor is configured to set the initial encryption rank for the at least one function input value equal to the number of operations to be performed in the calculation, including one occurrence of each operation contained in said loop, and
wherein the processor is configured to set the new encryption rank, each time that an operation is performed in the calculation on the encoded input value or on an encoded result produced by a previous operation, by decrementing an encryption rank by one, and the decoder is configured to provide a useable output value from the specific encoded result only when the encryption rank equals zero, modulo said first number.

16. The computing device as claimed in claim 9, wherein:

the calculation comprises a loop, containing a first number of operations that may be performed an unknown number of times, wherein the processor is configured to set the initial encryption rank for the at least one function input value equal to the number of operations to be performed in the calculation, excluding operations contained in said loop, wherein the processor is configured to set the new encryption rank, each time that an operation is performed in the calculation on the encoded input value or on an encoded result produced by a previous operation, by decrementing an encryption rank by one each time that an operation not contained in said loop is performed, and the decoder is configured to provide a useable output value from the specific encoded result only when the encryption rank equals zero.

17. A tangible computer-readable storage-media that is not a transitory propagating signal or wave, comprising control instructions for a method of performing a secure calculation, the method comprising:

receiving at least one function input value and a state input value;

determining a number of operations to be performed in the calculation;

setting an initial encryption rank for the at least one function input value based on the number of operations to be performed in the calculation;

performing the number of operations in the calculation, wherein a first operation is performed on the at least one function input value, and subsequent operations are performed on results produced by previous operations;

encoding the at least one function input value and state input value together with an initial encryption rank;

performing the calculation, such that the first operation is performed on the encoded input value to produce an encoded result, and subsequent operations are performed on respective encoded results produced by previous operations to produce further encoded results, and setting a new encryption rank when a subsequent operation in the calculation is performed on the encoded input value or on a respective encoded result produced by a previous operation, such that the encoded result of the subsequent operation in the calculation has the new encryption rank; and decoding a useable output value from a specific encoded result only when the specific encoded result has an encryption rank that has reached a predefined value.

* * * * *